(12) United States Patent (10) Patent No.: US 9,357,248 B2
Tumuluru et al. (45) Date of Patent: May 31, 2016

(54) METHOD AND APPARATUS FOR ADAPTIVE BIT RATE CONTENT DELIVERY

(71) Applicant: General Instrument Corporation, Horsham, PA (US)

(72) Inventors: Sundar Murthy Tumuluru, Bangalore (IN); Krishna Prasad Panje, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 324 days.

(21) Appl. No.: 13/802,316

(22) Filed: Mar. 13, 2013

(65) Prior Publication Data

US 2014/0282771 A1 Sep. 18, 2014

(51) Int. Cl.
*G06F 15/16* (2006.01)
*H04N 21/2662* (2011.01)
*H04N 21/2343* (2011.01)
*H04N 21/643* (2011.01)

(52) U.S. Cl.
CPC ... *H04N 21/2662* (2013.01); *H04N 21/234327* (2013.01); *H04N 21/64322* (2013.01)

(58) Field of Classification Search
CPC .......... H04N 21/2389; H04N 21/4385; H04N 21/8547; H04N 21/2662; H04N 21/2662
See application file for complete search history.

(56) References Cited

U.S. PATENT DOCUMENTS

| 8,325,800 | B2 * | 12/2012 | Holcomb et al. | 375/240.03 |
| 2008/0101369 | A1 * | 5/2008 | Sandoz et al. | 370/392 |
| 2011/0035507 | A1 * | 2/2011 | Brueck | H04L 29/06027 709/231 |
| 2011/0050860 | A1 * | 3/2011 | Watson | 348/51 |
| 2012/0023251 | A1 * | 1/2012 | Pyle et al. | 709/231 |

* cited by examiner

*Primary Examiner* — Joseph E Avellino
*Assistant Examiner* — Rachel J Hackenberg
(74) *Attorney, Agent, or Firm* — Thomas A. Ward

(57) ABSTRACT

A method performed by an apparatus provides for adaptive bit rate content delivery to one or more client devices. The method includes: receiving data presentation content encoded into a first data stream using a first set of encoding parameters, wherein the first data stream comprises a first plurality of frames corresponding to a first encoded bit rate, wherein each frame in the first plurality of frames includes as payload a portion of the data presentation content; receiving a request, for a client device, for a second data stream having a second bit rate that is lower than the first encoded bit rate; determining a first subset of the first plurality of frames, which corresponds to the second bit rate, and generating the second data stream using the first subset of the first plurality of frames, for delivering the data presentation content to the client device.

7 Claims, 6 Drawing Sheets

| NUM OF FRAMES | BIT RATE | LEVELS INCLUDED |
|---|---|---|
| 15 | 2.5 | L5 |
| 16 | 2.666666667 | L5, L1 |
| 17 | 2.833333333 | L5, L2 |
| 18 | 3 | L1, L2, L5 |
| 19 | 3.166666667 | L5, L3 |
| 20 | 3.333333333 | L5, L3, L1 |
| 21 | 3.5 | L5, L3, L2 |
| 22 | 3.666666667 | L5, L3, L2, L1 |
| 23 | 3.833333333 | L5, L4 |
| 24 | 4 | L5, L4, L1 |
| 25 | 4.166666667 | L5, L4, L2 |
| 26 | 4.333333333 | L5, L4, L2, L1 |
| 27 | 4.5 | L5, L4, L3 |
| 28 | 4.666666667 | L5, L4, L3, L1 |
| 29 | 4.833333333 | L5, L4, L3, L2 |
| 30 | 5 | L5, L4, L3, L2, L1 |

METHOD AND APPARATUS FOR ADAPTIVE BIT RATE CONTENT DELIVERY

FIELD OF THE DISCLOSURE

The present disclosure relates generally to transmitting media content over telecommunication systems to client devices, and more particularly to methods and apparatus for providing adaptive bit rate content delivery to the client devices.

BACKGROUND

As the variety of devices that have the capability of data presentation content (such as video) playback has increased, and as maximum bandwidth capacity for networks delivering the data presentation content has increased, so has user expectations for quality and speed of the playback of the delivered data presentation content. A prevalent standard used to support video downloads to different types of client devices over different network conditions is Hypertext Transfer Protocol (HTTP) Live Streaming (HLS). HLS, as described in Internet Engineering Task Force (IETF) Internet Draft *HTTP Live Streaming* publication (Pantos & May; ver. 10; Oct. 15, 2012-Apr. 18, 2013, and all subsequent versions (collectively referred herein to as HLS, the HLS draft specification, or the HLS standard)), is a client-driven protocol that divides a video presentation into discreet chunks, which can be downloaded separately and played in sequential order. While this approach makes effective use of network resources on average, degradation in user experience can result when the client device switches between variant streams having different bit rates, while playing the video presentation.

For example, the network providing the video presentation may include a server that reconfigures its encoder for different bit rates in order to provide the variant streams having the different bit rates. Each reconfiguration takes time, sometimes up to five or more seconds. In addition, normally, the changed bit rate stream has different encoding parameters, such as resolution, aspect ratio, profile/level, standard definition (SD)/high definition (HD), etc., than the previous data stream. This causes the client device to reset its video decoder to reconfigure to the new encoding parameters, which generates an additional playback delay. These delays produced by reconfiguration at the server side and at the client device side, as well as any decrease in resolution in the new data stream, can lead to significant video artifacts at the client device during video presentation playback.

Accordingly, there is a need for a novel method and apparatus for adaptive bit rate content delivery.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 6 illustrates an example table for converting a master data stream having a maximum encoded bit rate into other data streams having lower bit rates using the hierarchical frame structure shown in FIG. 5.

Figure 1:
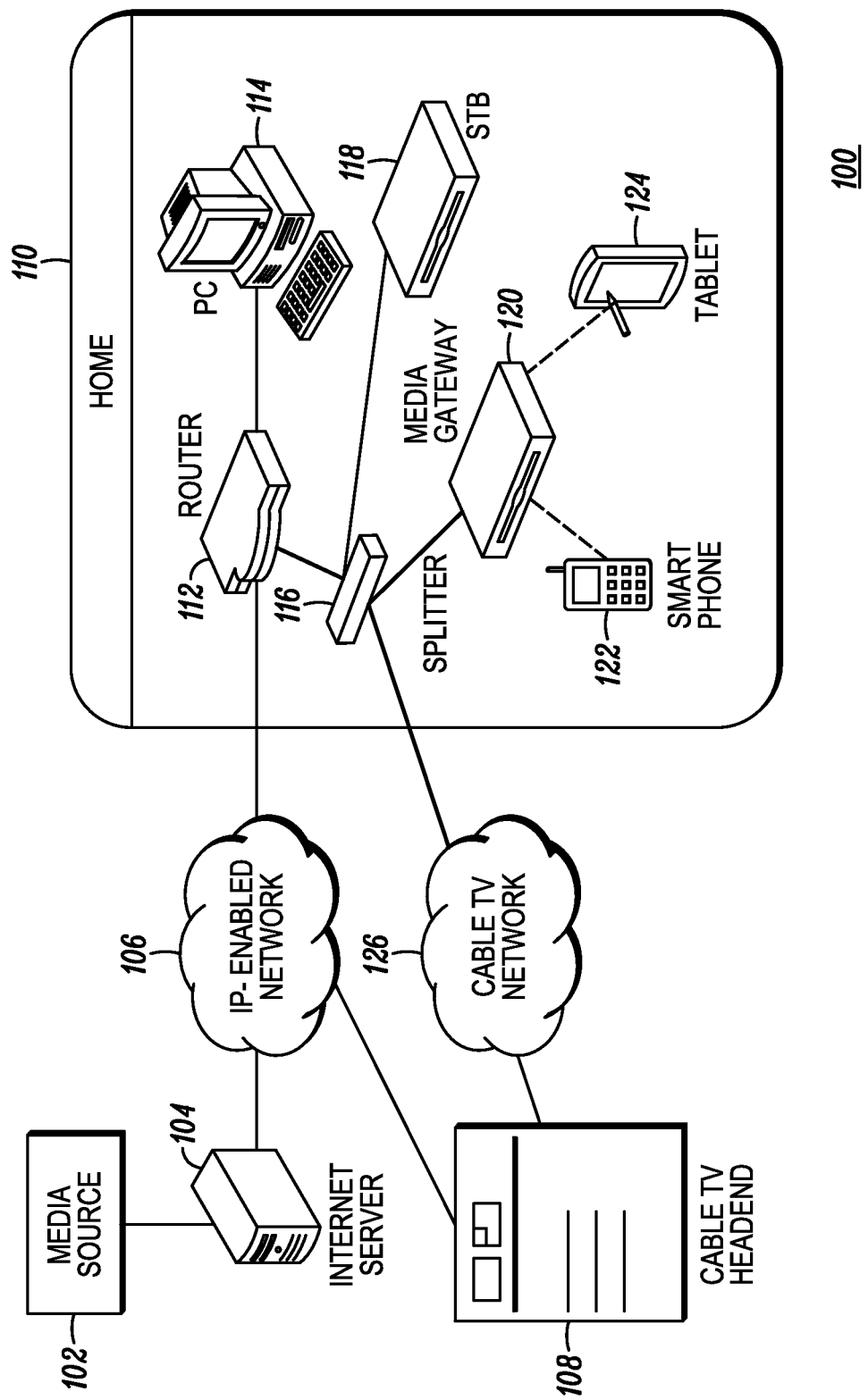
FIG. 1 is a system diagram illustrating a general network environment in which adaptive bit rate content delivery is performed in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, a user requests data presentation content, such as video content, to be delivered over a telecommunication network to the user's video playback device, also referred to herein as a client device. The data presentation content is delivered in different data streams having different client requested bit rates. A server uses a master data stream to generate each client requested bit rate by selecting some of a plurality of frames of the master data stream, which corresponds to the client selected bit rate and creating the data stream using the selected frames instead of using all of the frames of the master data stream. The server can further deliver the requested bit rate data stream with the same frame rate as the master data stream by inserting null frames into the requested bit rate data stream. Moreover, the server can deliver the requested bit rate data stream at the same resolution as the master data stream even where the bit rates are different. Maintaining the resolution across the data streams delivered to the client device and eliminating reconfiguration time at the server and client device sides leads to an improved video viewing experience.

In one example embodiment, a method provides for adaptive bit rate content delivery. The method includes: receiving data presentation content encoded into a first data stream (a master data stream) using a first set of encoding parameters, wherein the first data stream comprises a first plurality of frames corresponding to a first encoded bit rate, wherein each frame in the first plurality of frames includes as payload a portion of the data presentation content. The method further includes receiving a request, for a client device, for a second data stream having a second bit rate that is lower than the first encoded bit rate; and determining a first subset of the first plurality of frames, which corresponds to the second bit rate, and generating the second data stream using the first subset of the first plurality of frames, for delivering the data presentation content to the client device.

In another embodiment, an apparatus provides for adaptive bit rate content delivery. The apparatus includes an interface configured to receive a first request for a client device for a first data stream associated with a first bit rate and comprising data presentation content and configured to provide the first data stream for delivering the data presentation content to the client device. The apparatus further includes a processing unit configured to: determine a first subset of a first plurality of frames of a second data stream (a master data stream) containing the data presentation content, wherein the first plurality of frames corresponds to a maximum bit rate for the second data stream, and the first subset of the first plurality of frames corresponds to the first bit rate, which is lower than the maximum bit rate; and generate the second data stream using the first subset of the first plurality of frames.

In yet another embodiment, a method provides for adaptive bit rate content delivery. The method includes receiving a request, for a client device, for a first (variant) data stream containing data presentation content, wherein the first data stream has a lower bit rate than a maximum encoded bit rate of a second data stream (a master data stream) containing the data presentation content, wherein the second data stream comprises a first plurality of frames corresponding to the maximum encoded bit rate. The method further includes selecting a first subset of the first plurality of frames, which corresponds to the lower bit rate; and combining the first subset of the first plurality of frames with a set of null frames to generate the first data stream, which has a same frame rate as the second data stream.

The master data stream is the data stream from which other data streams, also referred to herein as variant streams or variant data streams, are generated. In one example implementation, the variant data stream has a different bit rate but a same resolution as the master data stream. Moreover, in one particular embodiment, the first plurality of frames of the master data stream is organized into a plurality of hierarchical levels comprising a base level comprising some of the first plurality of frames and a set of higher levels comprising the rest of the first plurality of frames, wherein only the frames in the base level are used to decode any dependently decodable frame in the set of higher levels, and wherein selecting the first subset of the first plurality of frames, which corresponds to the lower bit rate, comprises selecting frames from a subset the plurality of hierarchical levels. In a further embodiment, the subset of the plurality of hierarchical levels includes at least the base level.

Referring now to the drawings, and in particular FIG. 1, a system diagram illustrating a general network environment in which adaptive bit rate content delivery is performed in accordance with embodiments of the present teachings is indicated generally at 100. Within system 100, one or more devices are configured to download data presentation content comprising, for instance, video and audio content or any other suitable media content for playback on the device. Such devices are referred to herein as "client devices." The client devices shown in FIG. 1 include a personal computer (PC) 114, a set top box (STB) 118, a tablet 124, and a smart phone 122. However, client devices that can be used to playback data presentation content are not limited to such devices but may alternatively or additionally includes devices such as laptops, cellular phones, portable media players (PMPs), game consoles, and other electronic devices that can download and play media content. In an embodiment, each type of client device has a different set of capabilities that defines its playback characteristics. Such capabilities are also referred to herein as the client device's "hardware limitations," which include, but are not limited to, screen size, buffer capacity, and processing (e.g., decoding) ability, as examples.

The system 100 includes various infrastructure devices, such as an Internet server 104 and a cable television (TV) headend 108, which can be used to deliver data presentation content to the client devices. In one illustrative implementation, the Internet server 104 receives source content, also referred to herein as source media or media, from a media source 102. The media source 102 can be any device that provides source media including one or more of the client devices, e.g., the PC 114, smart phone 122, or tablet 124, which provide the source media as Over-The-Top (OTT) content to the Internet server 104. The media source 102 provides the media in a particular format, which is either compressed (e.g., lossy) or uncompressed (e.g., lossless). The Internet server may encode or transcode the source media to provide the data presentation content over an Internet Protocol (IP)-enabled network 106 to one or more of the client devices 114, 118, 122, or 124. In one particular embodiment, the IP-enabled network 106 represents a computer network that uses an HTTP protocol stack to govern the exchange of information. In a particular embodiment, the HTTP-enabled network 106 uses HTTP, Transmission Control Protocol (TCP), and IP protocols for its application, transport, and Internet layers, respectively.

As illustrated, the client devices are connected to a home network 110 for receiving the data presentation content from the Internet server 104. In an alternative arrangement, one or more of the client devices, e.g., the smart phone 122 and/or the tablet 124, need not be connected to the home network 110 to receive the data presentation content from the Internet server 104. The home network 110 includes one or more intermediary devices such as one or more routers 112, splitters 116, STBs 118 and/or media gateways 120 that deliver the data presentation content to the client devices from the Internet server 104. For example, the media gateway 120 transcodes the data presentation content into formats suitable for the client devices, e.g., smart phone 122 and tablet 124, connected to the media gateway; and the router directs the data presentation content to the clients devices, e.g., PC 114, connected thereto, without transcoding.

The cable television headend 108 receives television signals, for example, from television stations for processing and distribution as data presentation content over a cable TV network 126 to the one or more client devices connected to the home network 110. In one example implementation, the headend 108 delivers the data presentation content to a STB that streams the content to one or more other client devices in the home network 110 or provides the content as video-on-demand (VOD). Other sources of programming include those delivered by the Internet server 104 to the headend 108.

Only a limited number of system elements 102, 104, 108, and 112-124 are shown at 100 for ease of illustration, but additional such elements may be included in the system. Moreover, other elements needed for a commercial embodiment of the system 100 are omitted from the drawing for clarity in describing the enclosed embodiments.

As described in detail by reference to the remaining FIGS. 2-7, one or more apparatus within system 100, referred to herein generally as a "server", is configured for adaptive bit rate content delivery in accordance with the present teachings. This server provides data presentation content to one or more client devices and can be embodied in one or more of the Internet server 104, the media gateway 120, or the STB 118. In an embodiment, the present teachings are compatible with the HLS standard. In this embodiment, the server configured in accordance with the present teachings is further an HLS server that uses an HTTP protocol stack to govern the exchange of information with the client devices in conformance with the HLS standard.

Figure 2:
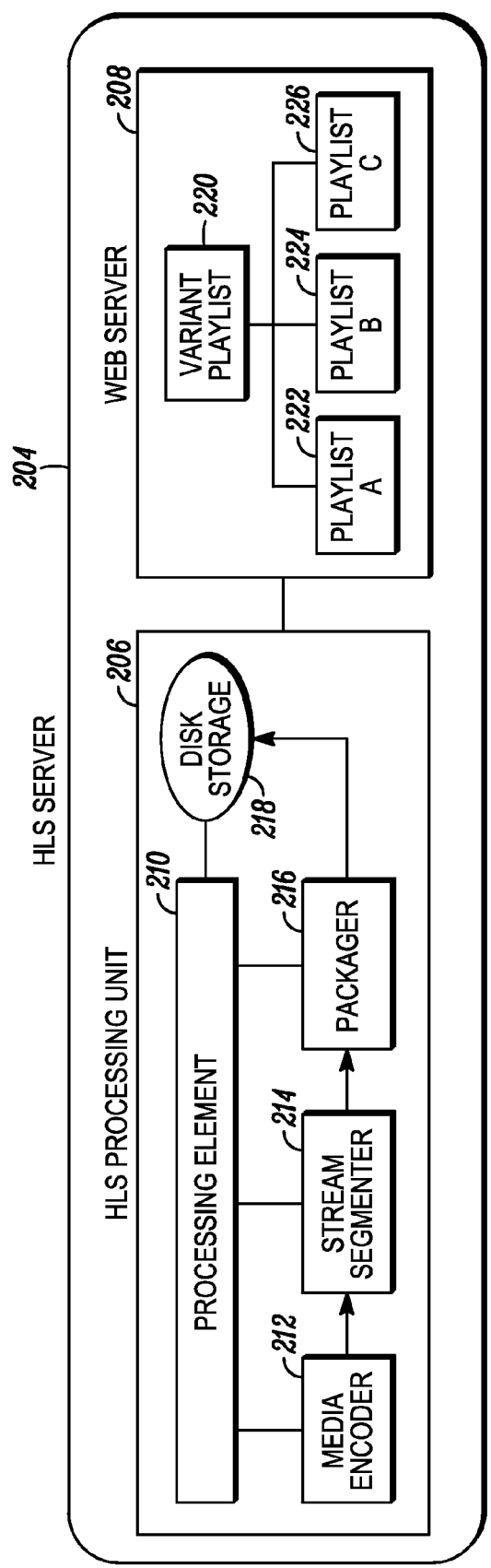
FIG. 2 is a system diagram illustrating an HLS server configured to perform adaptive bit rate content delivery in accordance with embodiments of the present disclosure.

FIG. 2 is a system diagram illustrating an HLS server 204 configured to perform adaptive bit rate content delivery in accordance with embodiments of the present disclosure. The HLS server 204 (also referred to herein as a streaming server) includes an HLS processing unit 206 (also referred to herein simply as the "processing unit") and a web server 208. The HLS processing unit 206, in turn, comprises a processing element 210 and disk storage 218. Additionally, the HLS processing unit 206 is shown to comprise a media encoder 212, a stream segmenter 214, and a packager 216, which, in an embodiment, are logical indications of functionality performed by the HLS processing unit 206.

We now turn to a brief description of the elements within the HLS server 204. For example, in general, a plurality of its constituent elements are adapted with functionality in accordance with embodiments of the present disclosure as described in detail below with respect to the remaining FIGS. 3-7. "Adapted," "operative" or "configured" as used herein means that the indicated elements are implemented using one or more memory devices, interfaces, and/or processing devices that are operatively coupled. The memory devices, interfaces, and/or processing devices, when programmed, form the means for these system elements to implement their desired functionality.

The interface, which is not shown but is used to establish and maintain connections between other system elements such as the media source 102 and one or more client devices, is used for passing signaling, also referred to herein as messaging (e.g., messages, packets, datagrams, frames, superframes, and the like), containing control information, voice, or non-voice media. The implementation of the interface in any particular element depends on the particular type of network, i.e., wired and/or wireless, to which the element is connected. For example, the HLS server 204 can contain a wireless interface to establish wireless connections to an HTTP-enabled network, for instance, such as network 106; and the HLS server 204 can contain wired interfaces to establish wired connections to other infrastructure devices. Examples of wired interfaces include Ethernet, T1, USB interfaces, etc. Examples of wireless interfaces include wireless protocols and associated hardware that support technologies including, but not limited to, HLS, HTTP, Long Term Evolution (LTE), CDMA, GSM, Wi-Fi, etc.

Where the system 204 supports wireless communications, the interfaces comprise components including processing, modulating, and transceiver components that are operable in accordance with any one or more standard or proprietary wireless interfaces, wherein some of the functionality of the processing, modulating, and transceiver elements can be performed by means of one or more processing devices through programmed logic such as software applications or firmware stored on the memory device of the system element or through hardware. In a particular embodiment, the connections maintained by the interface are IP connections.

Processing devices (e.g., the HLS processing unit 206 and processing element 210) utilized by the elements of the HLS server 204 may be partially implemented in hardware and, thereby, programmed with software, firmware logic or code for performing their functionality as described, for example, by reference to FIGS. 3-7; and/or the processing devices may be completely implemented in hardware, for example, as a state machine or ASIC (application specific integrated circuit). The memory (e.g., disk storage 218) implemented by these system elements can include short-term and/or long-term storage of various information needed for the functioning of the respective elements. The memory may further store software or firmware for programming the processing device with the logic or code needed to perform its functionality.

Turning back again to the detailed description of the system 204 elements, the HLS server 204, interchangeably referred to herein as "the server," manages the methods described throughout these teachings for adaptive bit rate content delivery. To accomplish this, the HLS server 204 comprises a processing element 210, interchangeably referred to herein as a "computer," which can be programmed, for example, via a non-transient computer-readable storage element having computer-readable code stored thereon.

In an embodiment, interfaced to the HLS server 204 is a media source, which streams media content to the media encoder 212 within the HLS processing unit 206. In alternate embodiments, the media encoder 212 can be located outside of the HLS server 204. If the media content is compressed, the media encoder 212 may transcode the media from one compressed format into another. Where the media content is uncompressed, the media encoder 212 encodes the media. In a particular embodiment, independent of the format of the media received from a media source, output data streams from the media encoder 212 are encoded using MPEG-4 media compression, e.g., MPEG-4 part 10 Advanced Video Coding (AVC)/H.264 video compression with Advanced Audio Coding (AAC) audio compression, and encapsulated using an MPEG-2 transport-stream container format (also referred to herein as an MPEG-2 transport stream). Such an embodiment, however, is not limiting, and other forms of encoding and/or encapsulation may be used to implement the teachings described herein.

In one embodiment, the media encoder 212 generates a plurality of variant data streams from a master data stream to which it has access. Each variant stream corresponds to a different bit rate than a bit rate of the master data stream. A "data stream" is a sequence of data units containing data presentation content. The "bit rate," which can be quantified using the unit bits per second (bit/s) for instance, refers to the information density of an encoded data stream or file, specifically, the number of bits per unit of playback time. As used herein, bit rate, in general, refers to the bit rate of any data stream including a master data stream and variant data streams created from the master data stream using the present teachings. Whereas, the encoded bit rate refers specifically to the bit rate of the master data stream.

In one embodiment, a server such as the HLS server 204 provides for adaptive bit rate content delivery using an interface configured to receive a request for a client device for a variant data stream associated with a first bit rate and comprising data presentation content and configured to provide the variant data stream for delivering the data presentation content to the client device. When the server is an HLS server, the interface is further configured to receive the first request and provide the variant data stream using Hypertext Transfer Protocol.

Moreover, the server provides for adaptive bit rate content delivery using a processing unit such as the HLS processing unit 206 configured to: determine a first subset of a first plurality of frames of a master data stream containing the data presentation content, wherein the first plurality of frames corresponds to a maximum bit rate for the master data stream, and the first subset of the first plurality of frames corresponds to the first bit rate, which is lower than the maximum bit rate; and generate the variant data stream using the first subset of the first plurality of frames. Furthermore, in accordance with the present teachings, the processing unit is configured to generate the variant data stream to have a same resolution as the master data stream. "Resolution" refers to the detail of the payload within the frames of a data stream as described, for example, by pixel count and/or spatial resolution.

In addition, the server's processing unit 206 may be further configured to substitute or replace the remainder of the first plurality of frames of the master data stream with null frames to cause the variant data stream delivered to the client device to have a same frame rate or frame frequency, as the master data stream. The "frame rate" means the rate or frequency at which a device, such as an imaging device or an encoder, produces consecutive images called frames. Thus, with respect to a master data stream, the frame rate is defined by a first time period over which a total number of frames within the first plurality of frames is produced. In one embodiment, the frame rate is measured in units of frames per second (fps).

In one particular embodiment, the first plurality of frames of the master data stream is organized into a plurality of virtual hierarchical levels having a base level and a set of one or more upper levels, wherein each level within the plurality of virtual hierarchical levels includes a different portion of the first plurality of frames. The processing unit is configured to substitute the remainder of the first plurality of frames with null frames by substituting the frames within at least one level of the set of upper levels with null frames.

Turning back to the description of the elements of the HLS server 204, the stream segmenter 214 receives the plurality of variant MPEG-2 transport streams output by the media encoder 212 and subdivides or partitions each variant MPEG-2 transport stream into a sequence of media segment files of smaller duration (typically between 1 to 10 seconds, although durations that fall outside of this range are also possible). Media segment files, sometimes referred to in the art as "chunks," are also referred to herein as "media segments." The term "duration," as used herein, is defined as the playback time of a media segment file or stream portion played by a client device at normal speed (i.e., the intended playback speed of the presentation being streamed). The media segment files are then passed from the stream segmenter 214 to the packager 216, which prepares them for a specific delivery protocol. In a particular embodiment, for example, the delivery protocol supports HTTP GET requests under the HTTP pull model.

The system 204 stores the media segment files from the packager 216 within the disk storage 218 for the web server 208 to access and distribute. Disk storage 218 is a storage device comprising flash memory, solid-state devices, or one or more rotating platters having a surface layer on which data is digitally recorded e.g., an array of independent magnetic hard drives. As shown in FIG. 2, disk storage 218 is located within the HLS processing unit 206 of the HLS server 204. Alternate embodiments, however, allow for the storage of media segment files outside of the HLS processing unit 206. Possible locations include within the web server 208, internal to the HLS server 204 but external to the web server 208, or external to the HLS server 204. Additionally, substitute devices can be used for the storage of media segment files, such as optical drives and other compatible technologies.

The web server 208 delivers (i.e., serves up) the media segment files stored at 218 to one or more client devices. The functionality of the web server 208 can be implemented as hardware (i.e., a physical server), software (i.e., a computer program), or a combination of the two. Further, a physical web server can be located either within (as shown) or external to the HLS server 204. As indicated at 220, the web server 208 publishes (i.e., hosts) a variant playlist file (also referred to herein as a variant playlist) by making it accessible to one or more client devices. In an embodiment, the processing unit 206 of the HLS server 204 is configured to provide the variant playlist file to the client device having a format in conformance with HLS and to provide media segments to the client device using HTTP.

The variant playlist file 220 serves as a directory that contains entries pointing to individual playlists A 222, B 224, and C 226 (also referred to herein as playlist files) which, in turn, contain entries that point to individual media segment files from the variant streams. The system 204 associates each individual playlist published by the web server 208 with a variant data stream having a specific bit rate. The variant data streams are generated from the master data stream in accordance with the present teachings as described, for example, by reference to the remaining FIGS. 3-7. In an embodiment, the master data stream is also identified as a playlist on the playlist file 220 for providing to a client device requesting a bit rate corresponding to the encoded bit rate of the master data stream.

Figure 3:
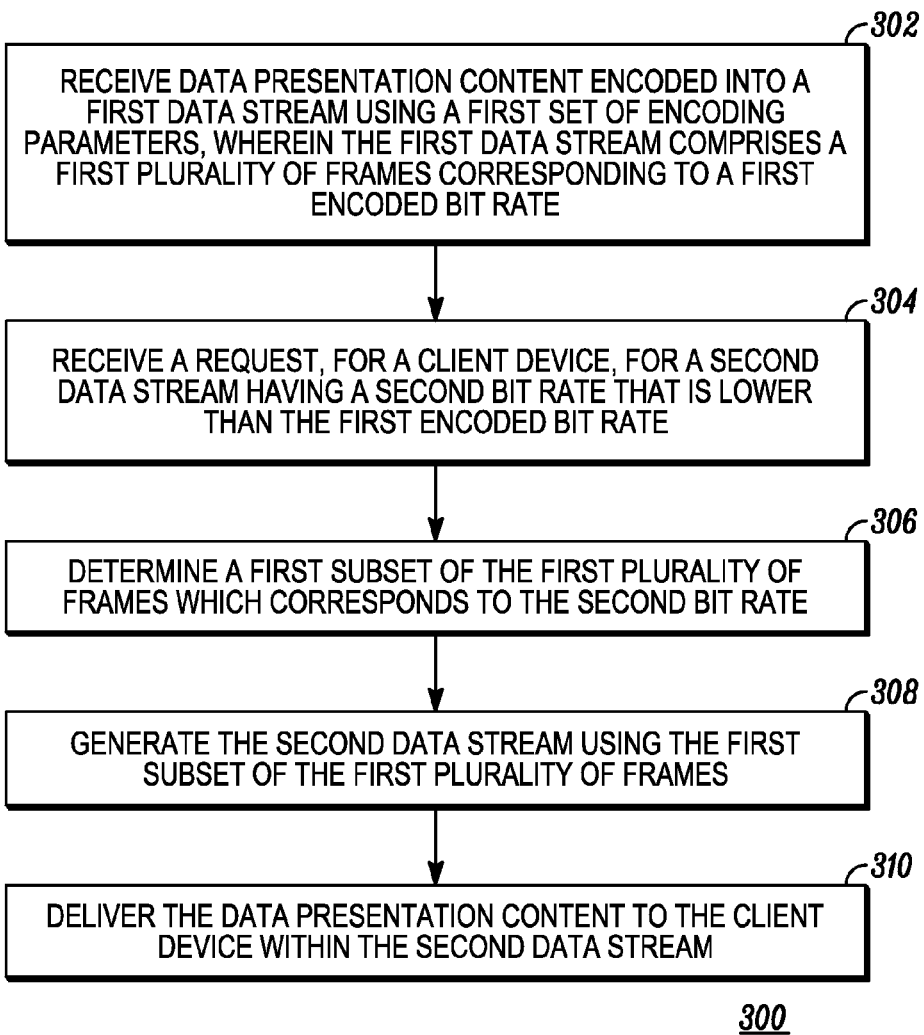
FIG. 3 is a flowchart illustrating a method for providing adaptive bit rate content delivery in accordance with embodiments of the present disclosure.

We turn now to a detailed description of the functionality of a server such as the HLS server 204 in accordance with the teachings herein and by reference to the remaining figures. FIG. 3 is a logical flowchart illustrating a method 300 for providing adaptive bit rate content delivery in accordance with embodiments of the present disclosure. The method can be performed by any device acting as a server to provide a number of variant data streams, and optionally the master data stream, each having a different bit rate to one or more client devices. Such server devices include, but are not limited to, the Internet server 104, the media gateway 120 and/or the STB 118 shown in FIG. 1. In the following description, the server performing the method 300 is an HLS server such as the HLS server 204. However, such a limitation is illustrative only and not required.

At 302, the HLS server 204 receives data presentation content encoded into a first (master) data stream using a first set of encoding parameters. The master data stream comprises a first plurality (i.e., two or more) of frames corresponding to or associated with a first encoded bit rate. As such, it can be said that the master data stream containing the first plurality of frames has, corresponds to, or is associated with a first encoded bit rate. The first encoded bit rate is a maximum encoded bit rate or maximum bit rate for the master data stream. In an embodiment, each frame includes a header and payload, wherein the payload comprises a portion, which is some or part, of the data presentation content. That portion of the data presentation content can, for example, correspond to an image or picture of video. By contrast, a "null" frame, also referred to herein as a "not-coded frame" does not contain data presentation content. In one example implementation, a null includes only an "empty header," which is a header without payload, which may or may not be compressed. A non-compressed header is also referred to herein as a non-coded or not-coded frame.

In one implementation scenario, the encoder 212 within the HLS server 204 creates the master data stream by encoding an uncompressed data stream received from a media source or by transcoding a compressed data stream received from the media source. In such as case, the HLS server 204 implicitly "receives" the master data stream upon its creation by the media encoder 212. In an alternative arrangement, an encoder, which is external to the HLS server 204, encodes the data presentation content to create the master data stream. In this arrangement, the HLS server 204 explicitly receives the master data stream from the external encoder. The term "encode" as used herein refers to how the data presentation content within a media file or data stream is formatted. The "encoding parameters" are the one or more parameters used to produce the format of the data stream. In one example implementation, the encoding parameters include, but are not limited to, one or more of resolution, aspect ratio, bit rate, frame rate, SD or HD, profile and level, etc.

As stated above, the data streams (including the master data stream) comprise a sequence of media segments, in one embodiment. Accordingly, media segments, which generally comprise a container, encoded video, encoded audio, and possibly an encryption protocol, represent portions of the content making up a streamed media presentation that are downloaded separately and played sequentially in the correct order. The video information within a media segment is encoded as a series of frames, with each frame representing a snapshot in time. There are two basic frame types: independently decodable (I) frames, which can be decoded without referencing any other frame, and dependently decodable (e.g., B and P) frames, which are decoded by referencing previous and/or successive frames. A sequence of frames that comprises an independent frame and all the frames that depend from it is defined as a group of pictures (GOP). Each GOP is self-contained in that it contains all the information to completely decode it and is, thereby, independently decodable (i.e., capable of being decoded) without referencing another GOP.

Figure 7:
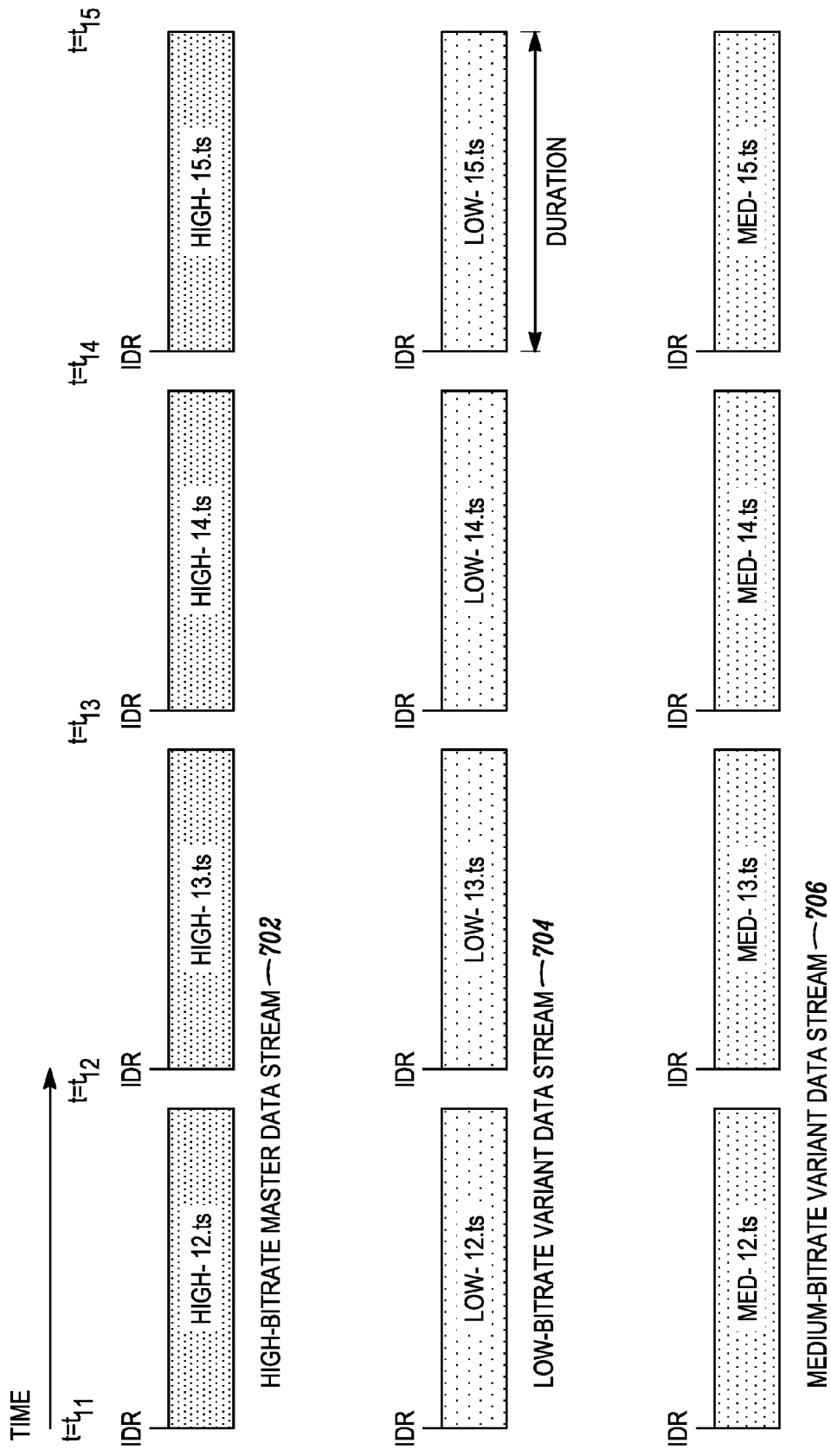
FIG. 7 is a schematic diagram of example media segment files for providing adaptive bit rate content delivery in accordance with embodiments of the present disclosure.

Turning momentarily to FIG. 7, which illustrates three data streams 702, 704, and 706 containing the same portion of data presentation content. Each data stream is shown as containing four media segments (i.e., ".ts" files) starting, respectively, at times t=$t_{11}$ (a 12.ts file), t=$t_{12}$ (a 13.ts file), t=$t_{13}$ (a 14.ts file), and t=$t_{14}$ (a 15.ts file). The data stream 702 is the master data stream, in this illustration, and has the highest (i.e., a "high") bit rate of all three data streams shown. The data streams 704 and 706 are variant data streams generated from the master data stream 702, in accordance with the present teachings. In one particular embodiment, each variant data stream 704 and 706 corresponds to a playlist file identified within a variant playlist, such as the variant playlist 220 of FIG. 2, provided to the client device. As shown, the variant data stream 704 represents a data stream having a "low" bit rate as compared to the encoded bit rate of the master data stream. The variant data stream 706 represents a data stream having a "medium" bit rate as compared to the encoded bit rate of the master data stream.

Moreover, in one illustrative implementation, each media segment within each data stream 702, 706, and 706 comprises one or more GOPs beginning with an independently decodable frame. In the HLS implementation the independently decodable frame is an IDR, but can be another type of frame such as an I frame, depending, for instance, on the compression algorithm used to encode the frames. In an embodiment, each GOP within each media segment of the master data stream 702 comprises the "first plurality of frames" to which method 300 is applied. Accordingly, in this embodiment, method 300 is repeated for each GOP within each media segment of data presentation content that is requested for download by a client device.

Turning back to the method 300 of FIG. 3, at 304, the HLS server receives a request, for a particular client device, for a second (variant) data stream having a second bit rate that is lower than the maximum encoded bit rate of the master data stream. For example, the bit rate associated with the variant data stream meets one or both of a network bandwidth constraint or a hardware limitation realized by the client device. In one embodiment, the request for the client device is or is based on an explicit request such as a HTTP GET message or any other suitable standard or proprietary message. In an alternative embodiment, the request for the client device comprises an "implicit" request based on information supplied to the HLS server indicating that the client device can only support the lower bit rate. For instance, the client device informs the server of its hardware limitations or constraints or of network bandwidth constraints or limitations, such as a decrease in network capacity, that impact the bit rate that the client can support. Alternatively, the HLS server itself monitors network bandwidth and is, thus, aware of any such network bandwidth constraints.

The HLS server, for instance in one or more components of the HLS processing unit 206, generates the requested variant stream from the master data stream. More particularly, at 306 and 308, instead of performing a separate encoding with different encoding parameters to generate the variant data stream (as in the prior art), the HLS server 204 determines a first subset (meaning less than all) of the first plurality of frames (e.g., of a media segment), which corresponds to the requested bit rate, and generates the variant data stream using the first subset of the first plurality of frames. By using frames from the master data stream to create the variant data stream, the first plurality of frames included in the master data stream and the first subset of the first plurality of frames included in the variant data stream are encoded using the same first set of encoding parameters, which comprises being encoded at a same resolution.

Figure 4:
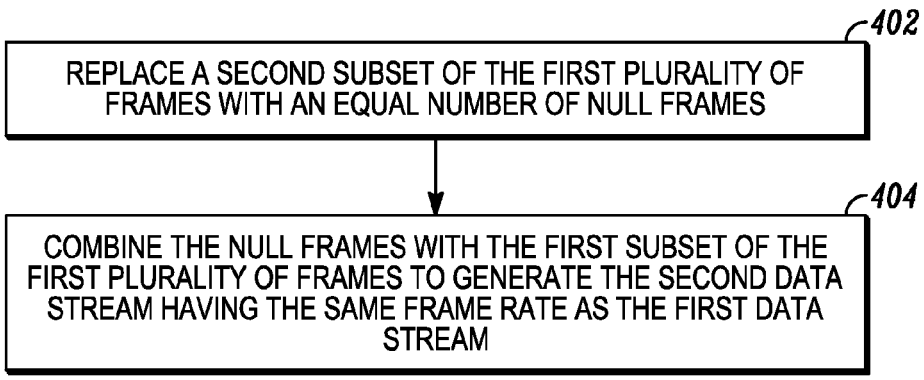
FIG. 4 is a flowchart illustrating a method for replacing frames of a master data stream with null frames for providing adaptive bit rate content delivery in accordance with embodiments of the present disclosure.

Any suitable algorithm can be used to perform the functionality shown at 306 and 308. However, one particular methodology is explained by reference to FIGS. 4-6. More particularly, FIG. 4 shows a flowchart illustrating a method 400 for replacing or substituting frames of a master data stream with null frames for providing adaptive bit rate content delivery in accordance with embodiments of the present disclosure. In general, at 402, the HLS server 204 replaces a second subset of the first plurality of frames (of the media segment being processed) with an equal number of null frames. At 404, the HLS server 204 combines the null frames with the first subset of the first plurality of frames to generate a second plurality of frames having, within a particular time period, the same total number of frames as the first plurality of frames. In this manner, the variant data stream and the master data stream have the same frame rate.

For example, a client device requests to download LOW-12.ts, LOW-13.ts, and LOW-14.ts, of the variant data stream 704, which has a bit rate of 3 Mbps. The HLS server 204 generates the variant data stream 704 using the master data stream 702, which in this example has an encoded bit rate of 5 Mbps. In an embodiment, method 300 is used to generate each GOP within the LOW-12.ts from a subset (i.e., less than all) of the plurality of frames that make up the corresponding GOP within the HIGH-12.ts of the master data stream 702, in accordance with method 400 and by reference to a hierarchical frame structure 500 of FIG. 5 and an accompanying table 600 of FIG. 6. Additional iterations of method 300 can be used to similarly derive each GOP of LOW-13.ts and LOW-14.ts from the corresponding GOP within HIGH-13.ts and HIGH-14.ts, respectively.

Figure 5:
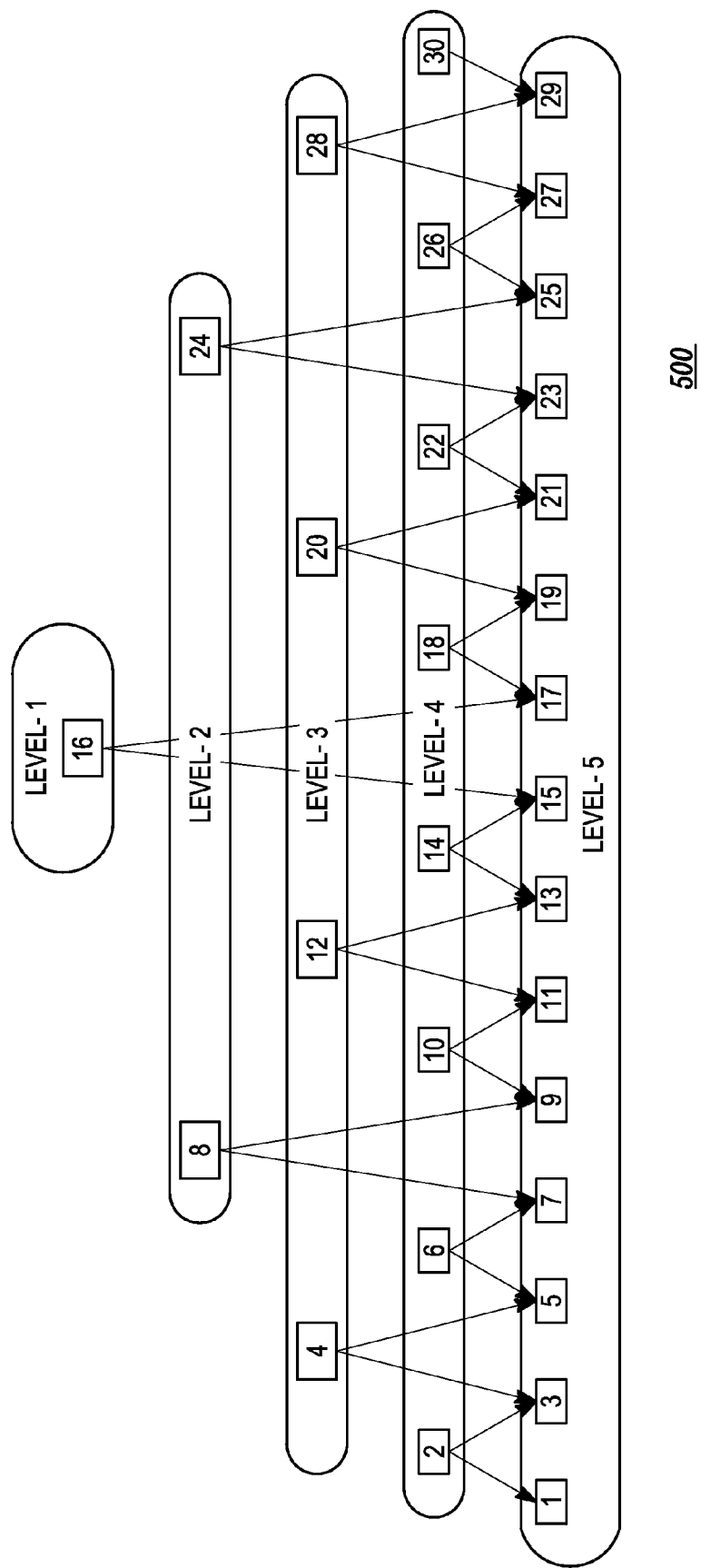
FIG. 5 illustrates an example hierarchal frame structure for a master data stream for use in providing adaptive bit rate content delivery in accordance with embodiments of the present disclosure.

More particularly, in the embodiment shown by reference to the structure 500 of FIG. 5 and the table 600 of FIG. 6, the first plurality of frames, e.g., of each GOP of HIGH-12.ts, is organized into a plurality of virtual hierarchical levels having a base level illustrated as level-5 and at least one upper or higher level. In this example, the at least one or set of upper levels includes four levels, level-1, level-2, level-3, and level-4. However, any number of upper levels can be used depending on the number of bit rate levels maintained by the HLS server 204. The levels are "virtual" in that they have a particular organization with a memory structure, such as the disk storage 218. In an embodiment, the HLS processing unit 206 organizes the hierarchical structure 500 of each GOP within each media segment using one or more of the processing element 210, the media encoder 212, the stream segmenter 214, or the packager 216.

Moreover, in this case, the frame rate of the master data stream 702 is 30 fps, for instance; and the plurality of frames within the first plurality of frames of each GOP of HIGH-12.ts includes frames 1 to 30. As shown, each level within the plurality of virtual hierarchical levels includes a different portion of the first plurality of 30 frames. The 30 frames are portioned or split within the five levels to facilitate multiple variant data streams having different bit rates. In this example hierarchical structure and frame rate, the base level (level-5) includes frames 1, 3, 5, 7, 9, 11, 13, 15, 17, 19, 21, 23, 25, 27, and 29. The next highest level (level-4), which is also the lowest upper level, includes frames 2, 6, 10, 14, 18, 22, 26, and 30. The next highest level (level-3) includes frames 4, 12, 20, and 28. The next highest level (level-2) includes frames 8 and 24. The uppermost level (level-1) of structure 500 includes frame 16. In this case, 30 fps was used as an example frame rate. However, the embodiments are applicable to different frame rates, both higher and lower. Moreover, where a higher frame rate is used, additional levels can also be used to generate the requested bit rates. In general, the number of levels and the positioning of the frames can be adjusted to provide different bit rates.

In addition, the base level (level-5) of the plurality of virtual hierarchical levels begins with an independently decodable frame (frame 1), which is an IDR frame in this example. Frames 2-30 are dependently decodable frames, such as B or P frames, in this illustration. However, one or more of the frames 2-30 can be an IDR frame. The arrowed line from one frame to another frame indicates that a frame can be dependently decoded based upon another frame. For example, frame 8 in level-2 points to frames 7 and 9 in level-5, indicating that frame 8 can refer to frame 7, frame 9, or both frames 7 and 9 for use in decoding frame 8.

In a further embodiment illustrated by reference to the structure 500, any frame used to decode the frames within the at least one upper level is included only in the base level. In other words, each frame used to decode the frames within the set of upper levels is included only in the base level. This embodiment couples the decoding dependency of the frames in the upper levels only to the frames in the base level and decouples the decoding dependency between the upper levels. Such an arrangement beneficially enables the HLS server 204 to drop frames from any of the upper levels of a GOP of a master data stream to generate a corresponding GOP within a requested variant data stream, without necessitating a different decoder for each level (as with prior art temporal scalability) and without creating decoding artifacts at the client device side.

Returning again momentarily to the blocks 306 and 308 of method 300, the HLS server 204, for each GOP of the master data stream, determines a subset of the plurality of 30 frames of the structure 500, which corresponds to a requested bit rate. The HLS server 204 generates each corresponding GOP of the variant data stream associated with the requested bit rate using the selected subset of the plurality of 30 frames. In an embodiment, the HLS server 204 uses a stored table, such as the table 600, to select the subset of the 30 frames. Table 600 includes a column 604 that corresponds to a bit rate that can be implicitly or explicitly requested by a client device. A column 602 indicates a number of frames from the 30 frames or a portion of the 30 frames needed to generate the bit rates illustrated in column 604. A column 606 illustrates the levels from structure 500, wherein the combination of the frames within those levels provides the bit rates illustrated in column 604.

In accordance with the table 600, a maximum bit rate of 5 Mbps is associated with providing all 30 frames of each GOP. However, variant data streams can be generated having successively lower bit rates by using fewer numbers of the 30 encoded frames within each GOP of the requested variant data stream, until a minimum bit rate of 2.5 Mbps corresponding to 15 frames is reached as shown in the first row of the table 600. In an embodiment, the base level of the plurality of virtual hierarchical levels (1-5) corresponds to this minimum bit rate. In this embodiment, a client device at a minimum receives, within the requested variant data stream, the frames of the base level-5 of each GOP of the master data stream. The client device could also receive frames from one or more of the upper levels (1-4) of each GOP of the master data stream, depending for instance on the network bandwidth and/or hardware limitations at the client.

In one illustrative implementation supported by the table 600, each compressed frame 1-30 consumes the same number of bytes. In other words, each frame is encoded using 0.16666 Mbps. For example, 2.5 Mbps (the minimum bit rate) is consumed out of 5 Mbps (the maximum encoded bit rate), for 15 frames. In an alternative implementation, the IDR frames consume the most bits. P-frames consume fewer bits than IDR frames, and B-frames consume fewer bits than P-frames. Accordingly, the frames in different levels can be coded with different bit rates to create variant bit rate streams maintaining the same video quality. In an embodiment, the allocation of bits per frame is performed by a bit rate algorithm inside of the encoder, e.g., the encoder 212.

Returning to the above example variant data stream request, the master data stream 702 has a maximum encoded bit rate of 5 Mbps, which corresponds to all 30 frames within each GOP of the hierarchical structure 500. A client device has requested a variant data stream 704 associated with a bit rate of 3 Mbps. Accordingly, the HLS server 204 selects the frames of levels (L) 1, 2, and 5, having a combined number of 18 frames, which corresponds to a bit rate of 3 Mbps. In an embodiment, to maintain the same frame rate between the master data stream and the data stream having the bit rate of 3 Mbps, the HLS server 204 inserts null or not-coded frames into the requested variant data stream in place of the 12 frames in the remaining levels, e.g., levels 3 and 4. Levels 3 and 4 are referred to herein as the remaining or second subset of the first plurality of 30 frames. These null frames or not-coded frames indicate to the decoder in the client device to repeat the previous or next frame, for instance.

In accordance with this particular embodiment, the HLS server 204 generates (308 of FIG. 3) the requested variant data stream by replacing (402 of FIG. 4) a second subset (e.g., the frames included in the levels 2 and 4) of the plurality of 30 frames with an equal number (12) of null frames. The HLS server 204 combines (404 of FIG. 4) the null frames with the first subset (e.g., the frames in levels 1, 3, and 5) of the plurality of 30 frames to generate a second plurality of frames (GOP) having, within the first time period (e.g., one second), the same total number of 30 frames as the first plurality of 30 frames of the master data stream GOP. Accordingly, replacing the second subset of the first plurality of frames with the equal number of null frames comprises replacing the frames within at least one level (e.g., levels 2 and 4) of the plurality (500) of virtual hierarchical levels with the null frames. In such as case, all of the frames within the base level are included in the second plurality of frames (GOP) of the variant data stream, which is provided to the client device, at 310 (of FIG. 3), to deliver the data presentation content.

In the embodiments described above, a single master data stream was used to generate all of the variant data streams. In a further embodiment, the HLS server uses multiple master data streams associated with a corresponding hierarchical frame structure and table, similar to structure 500 and table 600, respectively. Using multiple master data streams provides for a wider range of bit rates for the variant data streams provided to the client devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for adaptive bit rate content delivery, the method comprising:
receiving data presentation content encoded into a first data stream using a first set of encoding parameters, wherein the first data stream comprises a first plurality of frames corresponding to a first encoded bit rate, wherein each frame in the first plurality of frames includes as payload a portion of the data presentation content;
receiving a request, for a client device, for a second data stream having a second bit rate that is lower than the first encoded bit rate;
determining a first subset of the first plurality of frames, which corresponds to the second bit rate, and generating the second data stream using the first subset of the first plurality of frames without re-encoding the second data stream, for delivering the data presentation content to the client device
wherein the first data stream and the second data stream have the same frame rate,
wherein the frame rate is defined by a first time period over which a total number of frames within the first plurality of frames is produced, and
wherein generating the second data stream comprises:
replacing a second subset of the first plurality of frames with an equal number of null frames; and
combining the null frames with the first subset of the first plurality of frames to generate a second plurality of frames having, within the first time period, the same total number of frames as the first plurality of frames.

2. The method of claim 1, wherein the first plurality of frames included in the first data stream and the first subset of the first plurality of frames included in the second data stream are encoded using the same first set of encoding parameters, which comprises being encoded at a same resolution.

3. The method of claim 1,
wherein the first plurality of frames is organized into a plurality of virtual hierarchical levels having a base level and at least one upper level, wherein each level within the plurality of virtual hierarchical levels includes a different portion of the first plurality of frames,
wherein replacing the second subset of the first plurality of frames with the equal number of null frames comprises replacing the frames within at least one level of the plurality of virtual hierarchical levels with null frames.

4. The method of claim 3,
wherein the base level of the plurality of virtual hierarchical levels corresponds to a minimum bit rate and begins with an independently decodable frame, and
wherein all of the frames within the base level are included in the second plurality of frames of the second data stream.

5. The method of claim 3, wherein the null frames each comprise an empty header.

6. The method of claim 3, wherein any frame used to decode the frames within the at least one upper level is included only in the base level.

7. The method of claim 1, wherein the second data stream corresponds to a playlist file identified within a variant playlist provided to the client device.

* * * * *